United States Patent
Mimih et al.

(10) Patent No.: US 7,702,106 B2
(45) Date of Patent: Apr. 20, 2010

(54) QUANTUM SECRET SPLITTING BASED ON NON-ORTHOGONAL MULTI-PARTICLE STATES

(75) Inventors: Jihane Mimih, San Francisco, CA (US); Mark Hillery, Metuchen, NJ (US); Ekaterina Rogacheva, Boston, MA (US)

(73) Assignee: MagiQ Technologies, Inc., New York, NY (US)

( * ) Notice: Subject to any disclaimer, the term of this patent is extended or adjusted under 35 U.S.C. 154(b) by 769 days.

(21) Appl. No.: 11/653,056

(22) Filed: Jan. 12, 2007

(65) Prior Publication Data

US 2007/0177735 A1 Aug. 2, 2007

Related U.S. Application Data

(60) Provisional application No. 60/760,713, filed on Jan. 20, 2006.

(51) Int. Cl.
*H04K 1/00* (2006.01)
*H04L 9/00* (2006.01)
(52) U.S. Cl. .................. 380/256; 380/255; 380/277
(58) Field of Classification Search ............ 380/255, 380/256, 277
See application file for complete search history.

(56) References Cited

U.S. PATENT DOCUMENTS

| 5,999,285 | A | 12/1999 | Brandt et al. | |
|---|---|---|---|---|
| 2009/0147955 | A1* | 6/2009 | Kim et al. | 380/256 |
| 2009/0175450 | A1* | 7/2009 | Brandt | 380/277 |

OTHER PUBLICATIONS

Schmid et al, "Experimental Single ubit Quantum Secret Sharing", Phys. Rev.Lett. vol. 95,pp. 230505-1-4, 2006.
Mimih et al,"Unambiguous discrimination of special sets of multipartite states using local measurement and classical communication", arXiv:quant-ph/0501174 v1, Jan. 28, 2005.
Lance et al, "Tripartite Quantum State Sharing", Phys.Rev.Lett. vol. 92, No. 17,pp. 177903-1-4, 2004.
Bagherinezhad et al,"Quantum sectret sharing based on reusable Greenberger-Horne-Zeilinger states as secure carriers", Phys.Rev.A vol. 67,pp. 044302-1-4, 2003.
Hillery et al,"Quantum Secret Sharing", Phys.Rev.A. vol. 59,No. 3, pp. 1829-1834, 1999.
Huttner et al, "Unambiguous quantum measurement of nonorthogonal states", Phys.Rev.A vol. 54,No. 5, pp. 3783-3789, 1996.
Shamir, "How to Share a Secret", Communications of the ACM vol. 22,No. 11, pp. 612-613, 1979.

* cited by examiner

*Primary Examiner*—Kimyen Vu
*Assistant Examiner*—Sayed Beheshti Shirazi
(74) *Attorney, Agent, or Firm*—Opticus IP Law, PLLC

(57) ABSTRACT

Systems and methods for quantum secret splitting based on non-orthogonal multi-particle states are disclosed. The method includes preparing at a sender ("Charlie") two qubits each of which can be in one of two non-orthogonal states and distributing the qubits to respective parties Alice and Bob. The method also includes measuring at Alice the state of the qubit she receives by a projective measurement so that the measurement result is either 0 or 1, and at Bob measuring the state of the qubit he receives such that the measurement result is either 0, 1 or f, wherein f represents a failure by Bob to properly measure the qubit state. The method also includes communicating between Alice, Bob and Charlie the outcome of their respective measurements so as to deduce the state of the qubits sent to Alice and Bob.

8 Claims, 2 Drawing Sheets

QUANTUM SECRET SPLITTING BASED ON NON-ORTHOGONAL MULTI-PARTICLE STATES

CLAIM OF PRIORITY

This application claims the benefit of priority under 35 U.S.C. §119(e) of U.S. Provisional Application Ser. No. 60/760,713, filed on Jan. 20, 2006, which application is incorporated by reference herein.

STATEMENT OF GOVERNMENTAL SUPPORT

This invention was made with Government support under Grant No. PHY 0139692 awarded by the National Science Foundation. The Government therefore has certain rights in this invention.

FIELD OF THE INVENTION

The invention relates to quantum communication, and in particular relates to systems for and methods of secret splitting based on non-orthogonal multi-particle states.

BACKGROUND INFORMATION

Splitting a secret message in a way that a single person is not able to reconstruct it is a common task in information processing, especially for high-security applications. One solution to this problem and its generalization including several variations is provided by classical cryptography and is called "secret sharing." Classical secret sharing involves splitting a message using mathematical algorithms and distributing the pieces to two or more legitimate users via classical communication. However, all classical communication systems are susceptible to eavesdropping attacks, which makes the secret vulnerable to unauthorized disclosure to unintended recipients.

Quantum cryptography systems exploit the quantum nature of particles to create an unconditionally secure communication system. Quantum cryptography systems employ the exchange of quantum particles, such as photons, that are encoded to form "qubits." The use of such quantum particles has been proposed for quantum communication, such as for "quantum secret sharing". Quantum communication can reveal eavesdropping in essentially the same manner as quantum cryptography, thus guaranteeing secure distribution of shared information.

The basic principles behind communicating between two parties with entangled qubits generated by a third party are understood as follows. Suppose we have two qubits prepared in one of two quantum states, $|\Psi_0\rangle$ or $|\Psi_1\rangle$. We now give one qubit to one party called "Alice" and one qubit to another party called "Bob." Both parties know that the state of the qubit is either $|\Psi_0\rangle$ or $|\Psi_1\rangle$, and their task is to perform local measurements on their qubits and communicate through a classical channel to determine the state they have been given. Alice and Bob can perfectly distinguish between the states using local operations and classical communication only if the states are orthogonal. When $|\Psi_0\rangle$ and $|\Psi_1\rangle$ are not orthogonal, Alice and Bob can use two different approaches to distinguish between the states.

The first approach is the minimum error state discrimination approach. In this approach, after Alice and Bob measure their qubits, each has to give a conclusive answer about the measured state and they are not allowed to give "I don't know" as an answer. However, since the states are not orthogonal, the price that the two parties must pay for giving a definite answer is the chance that they will make a mistake and incorrectly identify the state. The minimum probability of making a wrong guess, when each state is equally likely, is $$p_E = \frac{1}{2}\left(1 - \sqrt{1 - |\langle\Psi_0|\Psi_1\rangle|^2}\right). \quad (1)$$

An alternative approach to the state discrimination problem is the unambiguous state discrimination approach. In this approach, some measurement outcomes are allowed to be inconclusive, so that Alice and Bob might fail to identify the state. However, if they succeed they will not make an error. If each state is equally likely and both qubits are measured together, then the optimal probability to successfully and unambiguously distinguish the states is given by:

$$p_{idp} = 1 - |\langle\Psi_0|\Psi_1\rangle|. \quad (2)$$

The probability of getting an inconclusive result, which provides no information about the state, is $1-p_{idp}$. This success probability can also be achieved if Alice and Bob measure the qubits separately, and if they are allowed to communicate the measurement result through a classical channel. In this procedure, Alice makes a projective measurement on her qubit that gives her no information about the state, and she then communicates the result of her measurement to Bob. Based on this information, Bob is able to make a measurement on his qubit that allows him to decide, with a success probability of $p_{idp}$, what the initial state was.

There are difficulties if one wants to use this procedure as part of a quantum communication scheme. In a secret sharing scheme based on the above, Alice and Bob are each recipients of different parts of a message or key sent by a third-party "sender" named "Charlie." The message parts need to be combined in order for the message or key to be revealed. The first problem, then, is that if the parts are to be combined at a time significantly later than when they were sent, quantum memory is required to store the qubit states, i.e., the qubits have to be protected against decoherence for a long time.

If one attempts to surmount this difficulty by having the parties measure their qubits immediately upon receiving them, one is faced with the problem that the information gain is asymmetric. Alice learns nothing about the key, and Bob learns everything. The only way this could be useful is if Alice and Bob are in the same location and are to use the key immediately. If they are in separate locations and will be using the key later, another procedure is required.

In one approach, both parties measure their qubit immediately upon receiving it, each obtaining a result of either 0 or 1. There are thus four sets of possible measurement results: {0,0}, {1,1}, {0,1}, and {1,0}. The result {0,0} corresponds to $|\Psi_0\rangle$, the result {1,1} corresponds to $|\Psi_1\rangle$ and the results {0,1}, and {1,0} correspond to a "failure." It has been shown that when the two states have the same Schmidt basis, the probability of successfully identifying the state is given $p_{idp}$. This approach can be used in a secret-sharing scheme, wherein the set of measurement results obtained by Alice and Bob, which is classical information, can be stored indefinitely and compared at a later time to reveal the key.

This approach, however, has a significant drawback. The key bits for which the measurement failed, and which, therefore, must be discarded, are only identified after Alice and Bob have compared their bit strings. It would be much more efficient if the bits that must be discarded could be identified immediately.

SUMMARY OF THE INVENTION

The present invention includes systems and methods of quantum "secret splitting." The method includes preparing at a sender ("Charlie") two qubits each of which can be in one of two non-orthogonal states, and distributing the qubits to respective parties Alice and Bob. The method also includes measuring at Alice the state of the qubit she receives by a projective measurement so that the measurement result is either 0 or 1. The method also includes measuring at Bob the state of the qubit he receives such that the measurement result is either 0, 1 or f, wherein f represents a failure by Bob to properly measure the qubit state. The method also includes communicating between Alice, Bob and Charlie the outcome of their respective measurements so as to deduce the state of the qubits sent to Alice and Bob. This information can then be used by the parties for a common purpose.

Figure 1:
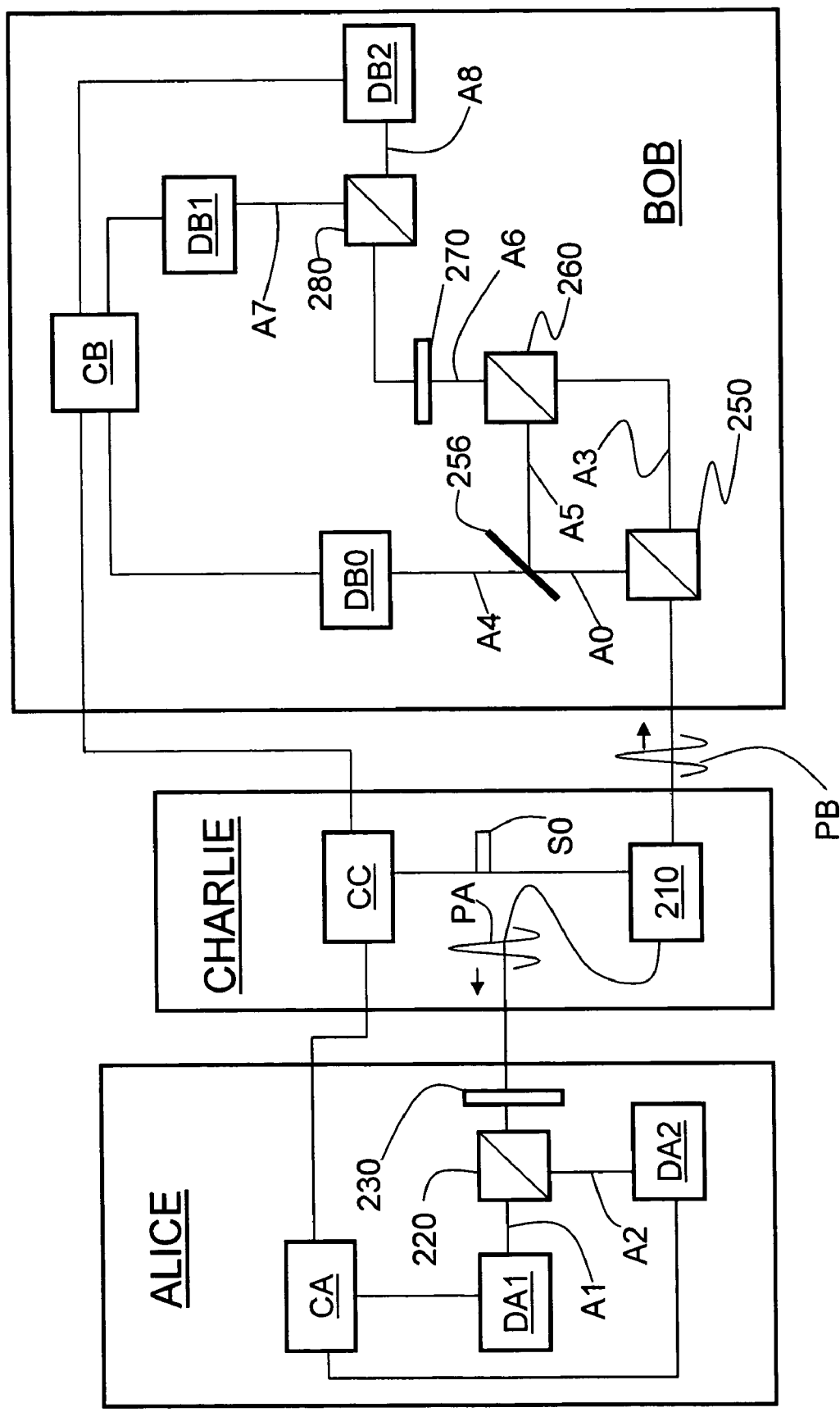
FIG. 1 is a schematic diagram of an example optical system used to carry out the method of the present invention.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE INVENTION

The invention relates to quantum communication, and in particular relates to systems for and methods of secret splitting based on non-orthogonal multi-particle states. The systems and methods according to the present invention are described in connection with parties named Alice, Bob and Charlie. The method includes the situation in which one of the parties involved in the quantum secret sharing has three possible measurement outcomes, 0, 1, or f for failure to distinguish. The remaining party has only 0 and 1 as the possible measurement outcomes. The case in which both Alice and Bob can receive a failure indication when the measurement fails is discussed in the article by Jihane Mimih and Mark Hillary, entitled "Unambiguous discrimination of special sets of multipartite states using local measurements and classical communications," *Phys. Rev. A*, 71, pg. 042314 (Jan. 20, 2005) (the "Mimih article"), which article is incorporated by reference herein. The Mimih article shows that the scheme in which both parties have three possible measurement outcomes is impossible for two-qubit states if both states are to be detected with a nonzero probability.

The description below sets forth a method of the present invention in which only one of the parties receives a failure signal is validated, and the necessary positive-operator-valued measure (POVM) is constructed. An example optical system for implementing the method is then set forth, wherein the qubits are photons and the qubit "value" of 0 or 1 is encoded in the photon polarization. Two photons are created and one photon each is sent to Alice and Bob. Using linear optics, Alice and Bob perform the necessary measurements and identify, with a certain probability, which of two possible two-photon states was generated and sent out by Charlie.

Finally, the example method of the present invention in which only one party receives a failure signal is generalized to N parties, and to "qutrits" rather than qubits. The scheme wherein N parties discriminate among three N-qutrit states is then set forth.

Mathematical Basis for the Secret-Splitting Method

An example embodiment of the secret-splitting method of the present invention is now described in which only one party receives a failure indication when the qubit-state measurement fails. No assumption is made about which party will receive a failure signal. Also considered is a special case in which $|\Psi_0\rangle$ and $|\Psi_1\rangle$ have the same Schmidt bases given by $$|\Psi_0\rangle = \cos\theta_0|00\rangle + \sin\theta_0|11\rangle,$$

$$|\Psi_1\rangle = \cos\theta_1|00\rangle + \sin\theta_1|11\rangle. \qquad (3)$$

The conditions that no errors are allowed are:

$$A_0 B_0|\Psi_0\rangle = 0, \, A_1 B_1|\Psi_0\rangle = 0,$$

$$A_0 B_1|\Psi_1\rangle = 0, \, A_1 B_0|\Psi_1\rangle = 0. \qquad (4)$$

These conditions imply that for $j=0, 1$ $$A_j = x_j|\eta_{Aj}\rangle\langle r_j|, \, B_j = y_j|\eta_{Bj}\rangle\langle s_j|, \qquad (5)$$

the vectors $|r_j\rangle$ and $|r_j\rangle$ are expressed in the basis $\{|0\rangle, |1\rangle\}$ as $$|r_0\rangle = a_0|0\rangle + a_1|1\rangle, \, |s_0\rangle = c_0|0\rangle + c_1|1\rangle,$$

$$|r_1\rangle = b_0|0\rangle + b_1|1\rangle, \, |s_1\rangle = d_0|0\rangle + d_1|1\rangle. \qquad (6)$$

The no-error conditions can now be expressed as $$(\langle r_0|\langle s_0|)|\Psi_0\rangle = 0, \, (\langle r_1|\langle s_1|)|\Psi_0\rangle = 0,$$

$$(\langle r_0|\langle s_1|)|\Psi_1\rangle = 0, \, (\langle r_1|\langle s_0|)|\Psi_1\rangle = 0. \qquad (7)$$

Defining the ratios $$z_0 = \frac{a_1}{a_0}, \quad z_1 = \frac{b_1}{b_0}, \qquad (8)$$

$$z_2 = \frac{c_1}{c_0}, \quad z_3 = \frac{d_1}{d_0}. \qquad (9)$$

Equations (7) become $$1 + z_0^* z_2^* \tan\theta_0 = 0, \, 1 + z_1^* z_3^* \tan\theta_0 = 0,$$

$$1 + z_0^* z_3^* \tan\theta_1 = 0, \, 1 + z_1^* z_2^* \tan\theta_1 = 0. \qquad (10)$$

A necessary condition for these equations to have a solution is that $\tan\theta_0 = \pm\tan\theta_1$. The case where $\tan\theta_0 = \tan\theta_1$ is not of interest, since this implies that our states are identical. We wish to examine the case where $\tan\theta_0 = -\tan\theta_1$, which implies that $\theta_0 = -\theta_1$. Hence, our two states can be expressed as $$|\Psi_0\rangle = \cos\theta_0|00\rangle + \sin\theta_0|11\rangle,$$

$$|\Psi_1\rangle = \cos\theta_0|00\rangle - \sin\theta_0|11\rangle. \qquad (11)$$

In this case, we find $$z_2 = -\frac{1}{z_0}\cot\theta_0, \, z_3 = \frac{1}{z_0}\cot\theta_0, \, z_1 = -z_0. \qquad (12)$$

The vectors $|r_j\rangle$ and $|s_j\rangle$ can now be expressed as $$|r_0\rangle = \frac{1}{\sqrt{1+|z_0|^2}}(|0\rangle + z_0|1\rangle),$$

$$|r_1\rangle = \frac{1}{\sqrt{1+|z_0|^2}}(|0\rangle - z_0|1\rangle),$$

$$|s_0\rangle = \sqrt{\frac{|z_0|^2}{1+|z_0|^2}}\left(|0\rangle + \frac{\cot\theta_0}{z_0}|1\rangle\right),$$

$$|s_1\rangle = \sqrt{\frac{|z_0|^2}{1+|z_0|^2}}\left(|0\rangle + \frac{\cot\theta_0}{z_0}|1\rangle\right).$$

The parameter $z_0$ is yet to be determined.

The failure operators for Alice and Bob can be expressed as $$A_f^\dagger A_f = I_A - |x_0|^2|r_0\rangle\langle r_0| - |x_1|^2|r_1\rangle\langle r_1|, \quad (13)$$

$$B_f^\dagger B_f = I_B - |y_0|^2|s_0\rangle\langle s_0| - |y_2|^2|s_1\rangle\langle s_1|, \quad (14)$$

where $x_0$, $y_0$, and $z_0$, where $j=0, 1$, must be chosen so that these are positive operators. The condition $A_f^\dagger A_f \geq 0$ implies that $$I_A - \frac{|x_0|^2}{1+|z_0|^2}(|0\rangle + z_0|1\rangle)(\langle 0| + z_0^*\langle 1|) - \frac{|x_1|^2}{1+|z_0|^2}(|0\rangle - z_0|1\rangle)(\langle 0| - z_0^*\langle 1|) \geq 0, \quad (15)$$

or, in matrix form, $$M_A = \begin{pmatrix} 1 - \frac{|x_0|^2 + |x_1|^2}{1+|z_0|^2} & -\frac{z_0^*(|x_0|^2 - |x_1|^2)}{1+|z_0|^2} \\ -\frac{z_0(|x_0|^2 - |x_1|^2)}{1+|z_0|^2} & 1 - \frac{|z_0|^2(|x_0|^2 + |x_1|^2)}{1+|z_0|^2} \end{pmatrix} \geq 0. \quad (16)$$

This matrix will be positive if both $\mathrm{Tr} M_A \geq 0$, which implies that $$2 - (|x_0|^2 - |x_1|^2) \geq 0, \quad (17)$$

and $\det M_A \geq 0$, which implies $$(1+|z_0|^2)^2[1-(|x_0|^2+|x_1|^2)] + 4|z_0|^2|x_0|^2|x_1|^2 \geq 0. \quad (18)$$

Similar conditions are found from the requirement that $B_f^\dagger B_f \geq 0$.

Our goal is to minimize the total failure probability $p_f$, which is found by summing over all measurement results that contain a failure signal, and is $$p_f = \frac{1}{2}\sum_{k=0}^{1}\left\langle\Psi_k\middle|\begin{pmatrix}A_f^\dagger A_f \otimes I_B + I_A \otimes B_f^\dagger B_f - \\ A_f^\dagger A_f \otimes B_f^\dagger B_f\end{pmatrix}\middle|\Psi_k\right\rangle. \quad (19)$$

We have assumed that the probability of receiving either $|\Psi_0\rangle$ or $|\Psi_1\rangle$ is the same, i.e., ½. We shall specialize to the case $x_0=x_1$ and $y_0=y_1$. As we shall see, this will still allow us to obtain the minimum achievable failure probability. Doing so we find that $$A_f^\dagger A_f = I_A - \frac{2|x_0|^2}{1+|x_0|^2}(|0\rangle\langle 0| + |z_0|^2|1\rangle\langle 1|), \quad (20)$$

$$B_f^\dagger B_f = I_B - \frac{2|y_0|^2|z_0|^2}{|z_0|^2 + \cot^2\theta_0}\left(|0\rangle\langle 0| + \frac{\cot^2\theta_0}{|z_0|^2}|1\rangle\langle 1|\right).$$

It is clear from Eq. (19) that the failure probability will be a minimum when $|x_0|$ and $|y_0|$ are as large as possible, subject to the constraint that the operators $A_f^\dagger A_f$ and $B_f^\dagger B_f$ are positive. From the above equations, we see that this implies that if $|z_0| \leq 1$, then $|x_0|^2 = (1+|z_0|^2)/2$, and $$A_f^\dagger A_f = (1-|z_0|^2)|1\rangle\langle 1|, \quad (21)$$

and if $|z_0| \geq 1$, then, and $|x_0|^2 = (1+1/|z_0|^2)/2$, and $$A_f^\dagger A_f = (1-1/|z_0|^2)|0\rangle\langle 0|. \quad (22)$$

We also have that if $\cot^2\theta_0 \leq |z_0|^2$, then $|y_0|^2 = (1+\cot^2\theta_0/|z_0|^2)/2$ and $$B_f^\dagger B_f = (1-\cot^2\theta_0/|z_0|^2)|1\rangle\langle 1|, \quad (23)$$

and if $\cot^2\theta_0 \geq |z_0|^2$, then $|y_0|^2 = (1+|z_0|^2/\cot^2\theta_0)/2$ and $$B_f^\dagger B_f = (1|z_0|^2/\cot^2\theta_0)|0\rangle\langle 0|. \quad (24)$$

Let us consider the case when $|z_0| \leq 1$ and $0 \langle \theta_0 \leq \pi/4$, which implies that Eqs. (21) and (24) apply. We then have that the failure probability is given by $$p_f = 1 - 2|z_0|^2\sin^2\theta_0, \quad (25)$$

and it is clear that this is minimized by choosing $|z_0|=1$. This gives us $$p_f = \cos(2\theta_0), \quad (26)$$

which is equal to the optimal failure probability for distinguishing the states $|\Psi_0\rangle$ and $|\Psi_1\rangle$. This failure probability is given by $$1 - p_{idp} = |\langle\Psi_1|\Psi_0\rangle| = \cos(2\theta_0). \quad (27)$$

This implies that by using this procedure, we can distinguish the states just as well by measuring the qubits separately and comparing the results as we can by performing a joint measurement on both of them.

Let us now summarize the results of the preceding calculations. The states we are distinguishing are given in Eq. (11) with $0 \leq \theta_0 \leq \pi/4$. Alice's POVM elements are $|r_j\rangle\langle r_j|$, for $j=0, 1$, with $$|r_0\rangle = \frac{1}{\sqrt{2}}(|0\rangle + |1\rangle), \quad (28)$$

$$|r_1\rangle = \frac{1}{\sqrt{2}}(|0\rangle - |1\rangle),$$

and $A_f=0$. This implies that Alice will only obtain the results 0 or 1 for her measurement, she will never receive a failure result. In fact, she simply performs a projective measurement. Bob's POVM elements are $$B_f^\dagger B_f = \frac{1}{2}(1 + \tan^2\theta_0)|s_j\rangle\langle s_j| \qquad (29)$$

for $j = 0, 1$, with $$|s_0\rangle = \sin\theta_0|0\rangle - \cos\theta_0|1\rangle, \qquad (30)$$
$$|s_1\rangle = \sin\theta_0|0\rangle + \cos\theta_0|1\rangle,$$

and, corresponding to the failure result, $$B_f^\dagger B_f = (1 - \tan^2\theta_0)|0\rangle\langle 0|. \qquad (31)$$

Examining these results, we can now see, in a simple way, how this procedure works. Define the single qubit states $|\psi_j\rangle$, for $j=0, 1$, as $$|\psi_j\rangle = \cos\theta_0|0\rangle + (-1)^j \sin\theta_0|1\rangle. \qquad (32)$$

When Alice performs her measurement, she obtains either 0 or 1. If she obtains 0, then Bob is left with the state $|\psi_1\rangle$ if $|\Psi_0\rangle$ was sent, and $|\psi_1\rangle$ if $|\Psi_1\rangle$ was sent. If she obtains 1, then Bob is left with the state $|\psi_1\rangle$ if $|\Psi_0\rangle$ was sent, and $|\psi_0\rangle$ if $|\Psi_1\rangle$ was sent. In either case, Bob is faced with discriminating between the non-orthogonal states $|\psi_0\rangle$ and $|\psi_1\rangle$. He then applies the optimal POVM to distinguish between these states, and if he succeeds, he knows which of the two states he has. What he does not know is which of his single-qubit states corresponds to $|\Psi_0\rangle$, and which to $|\Psi_1\rangle$. It is this bit of information that the result of Alice's measurement contains. Only by combining the results of their measurements can Alice and Bob deduce which state was sent.

The analysis in the preceding paragraph immediately allows us to see that there is another solution to the problem of finding a POVM in which one of the parties can receive a failure signal, and that is the one in which the roles of Alice and Bob are interchanged. In that case, Bob makes a projective measurement, and Alice makes a measurement whose results are described by a three-outcome POVM. (See, e.g., the article by B. Huttner, A. Muller, J. D. Gautier, H. Zbinden, and N. Gisin, entitled "Unambiguous quantum measurement of non-orthogonal states, *Phys. Rev. A* 54, 3782 (1996), (the "Huttner article,") which article is incorporated by reference herein).

For any two two-qubit states with the same Schmidt basis, which are called "Schmidt correlated," it is possible for Alice to transfer all of the information about the state to Bob by making a measurement in the basis $\{|r_0\rangle,|r_1\rangle\}$ and telling Bob the result of her measurement. In general Bob's measurement will depend on the results of Alice's. Thus, for special choices of the two states, Alice and Bob always make the same measurement, which means they can make the measurement as soon as they receive the particles. Each then possesses a classical bit, and by comparing these bits they can tell which state was sent to them.

Implementing the Method

An example of the secret-splitting method of the present invention is carried out among three parties. An example embodiment of the method is performed as follows.

The party named Charlie prepares and sends a pair of non-orthogonal two-qubit states (e.g., photons) and sends one qubit to Alice and one to Bob. The goal is to create a situation wherein neither Alice nor Bob can reconstruct the initial state independently, but can do so only by combining the results of their measurements. This can be accomplished using so-called "measurements with inconclusive results," as originally introduced by I. D. Ivanovic, in *Phys. Lett. A* 123, 257, 1987, which article is incorporated by reference herein. This measurement is a version of a so-called POVM type of quantum measurement, in contrast to a von Neumann type. The latter is a projection to the complete orthonormal set of the eigenvectors (resolution of identity), while the former is the projection to the non-orthogonal set but also resolution of identity. The POVM type of measurement allows the user to distinguish the non-orthogonal states without introducing errors. This task seems to be unrealistic from the first glance. At the same time, it becomes possible if in addition to the conclusive answer an inconclusive answer is allowed with some probability.

Now the task is to organize a procedure that easily separates conclusive and inconclusive measurement outcomes. The symmetric case where both Alice and Bob trace the inconclusive results is very inefficient. At the same time, if only one recipient of the entangled pair traces the inconclusiveness of the result, then the scheme can be efficiently implemented.

The procedure works as follows: Charlie prepares two photons in non-orthogonal entangled states using, for example, an spontaneous parametric down-conversion (SPDC) technique. He sends one qubit to Alice and one qubit to Bob. Alice and Bob each measure the qubit sent to them to measure its state. One of them (to be decided between them in advance)—say Bob—performs POVM and gets one of the three answers: yes, no, don't know. It must be stressed that yes and no answers do corresponds to error-free measurement, while "don't know" means no information can be further extracted from this measurement and the measurement must be discarded.

Alice performs the standard von Neumann type of measurement projecting the state to the two states "yes" and "no" (or equivalently "zero" and "one"). She gets only probabilistic information since sometimes her measurement outcome corresponds to the actual value sent by Charlie and sometimes not. Bob sends information about his "don't know" bits to Alice and Charlie so they learn which bits are not correlated and must be discarded. Remaining bits must be in perfect correlation, so only by combining their classical bits can Alice and Bob can reconstruct the initial bit sent by Charlie. Individually, they cannot do so, because the bit strings they have are perfectly uncorrelated with the bit string used by Charlie. It should be mentioned that the situation in this triangle is symmetric: instead of Alice and Bob, any other two participants can reconstruct the value of the bit of the third party.

Optical Realization of the Method

FIG. 1 is a schematic diagram of a secret-splitting optical system 200 adapted to carry out the method of the present invention by performing a three-outcome POVM at one of the parties, say Bob. Optical system 200 includes three parties, Alice, Bob and Charlie, with Charlie serving as the sender or distributor of the message. Charlie includes a light source 210, such as a SPDC source of entangled photons. Charlie also includes a controller CC operably coupled to light source 210 so as to control the operation of the light source via a control signal S0. In an example embodiment, the timing of control signals S0 is used to define "transmission slots" in which respective entangled photons are sent by Charlie to Alice and Bob. The slots are recorded in controller CC for future use in processing the photon measurements to obtain a final set of culled measurements, as described in greater detail below.

Alice includes a polarizing beamsplitter (PBS) 220 optically coupled to a polarization rotator 230, which is optically coupled to Charlie's light source 210. PBS 220 has associated therewith two optical paths A1 and A2 along which are arranged respective single-photon detectors (SPDs) DA1 and DA1. Alice also includes a controller CA operably coupled to SPDs DA1 and DA2 as well as to Charlie's controller CC.

Bob includes a PBS 250 optically coupled to Charlie's light source 210. PBS 250 has associated therewith two optical paths A0 and A3. A beamsplitter 256 is arranged along optical path A0 and has associated therewith an optical path A4 and an optical path A5. An SPD DB0 is arranged along optical path A4 while a PBS 260 is arranged at the intersection of optical path A5 and optical path A3. PBS 260 has an associated optical path A6 along which is arranged a polarization rotator 270. Polarization rotator 270 is in turn optically coupled to a PBS 280 that has associated therewith two optical paths A7 and A8, along which are arranged SPDs DB1 and DB2, respectively. SPDs DB1 and DB2 are operably coupled to a controller CB, which is operably coupled to Charlie's controller CC.

In an example embodiment of optical system 200, the aforementioned optical paths are provided by optical fiber sections.

Method of Operation of the Optical System

Optical system 200 is adapted for performing three-outcome POVM. In operation, Charlie's controller CC sends an activation signal S0 to light source 210 to cause the light source to generate two entangled photons PA and PB that travel to Alice and Bob, respectively. Photons PA and PB belong to possible states $|\Psi_0\rangle$ and $|\Psi_1\rangle$, which are two-photon states that allow for information to be encoded in the polarization of the photons. All four Bell states can be produced by source 210. The states are all orthogonal so that the linear superposition of any two in addition to one Bell state—say a singlet state—can be used to generate non-orthogonal states.

Figure 2:
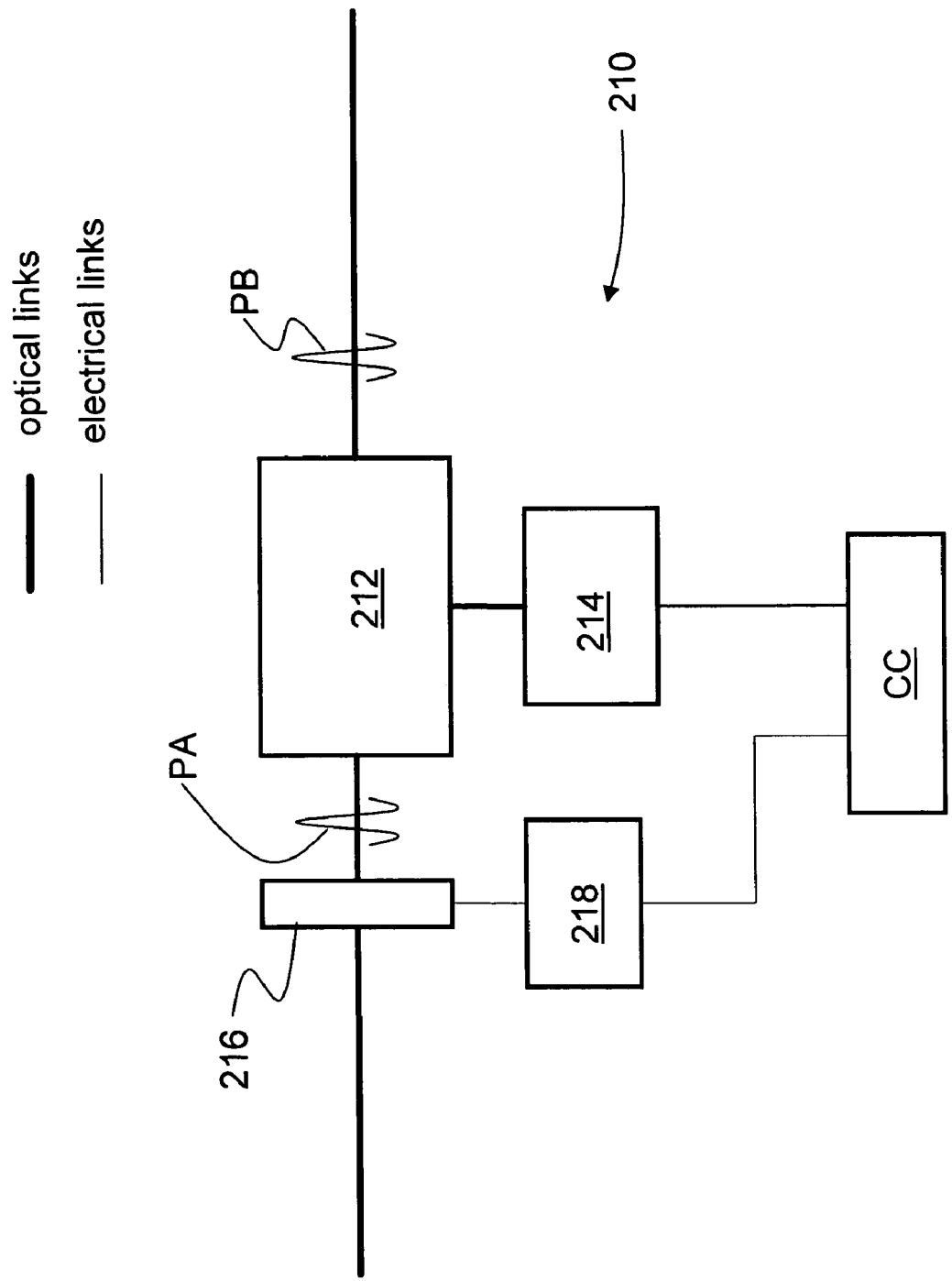
FIG. 2 is a schematic diagram of an example source of non-orthogonal entangled photons.

FIG. 2 shows an example embodiment of light source 210. A non-linear crystal 212 (e.g., BBO (beta-barium borate)) is optically pumped by a pump source 214, e.g., a UV source. The non-linear crystal 212 emits a pair of polarization-entangled photons PA and PB. The UV source (laser) is operably coupled to and controlled by controller CC.

A half wave plate 216 is placed in any optical path and its position/orientation is controller by controller CC. First, this half wave plate is used to make the entangled states emitted by non-linear crystal non-orthogonal. It can be implemented by rotating this half wave plate by $\theta_0$ degrees. Second, states $|\Psi_0\rangle$ or $|\Psi_1\rangle$ can be prepared by random choice of rotation of the half wave plate by 0 or $\pi/2$. The choice is determined by a signal from a true random number generator (RNG) 218 operably coupled to and controlled by controller CC. This allows Charlie to keep a record of states $|\Psi_0\rangle$ or $|\Psi_1\rangle$ generated and sent to the recipients Alice and Bob.

Let the state $|0\rangle$ corresponds to horizontal polarization and the state $|1\rangle$ to vertical polarization. Alice's measurement is then straightforward. Alice's photon PA travels through PBS 220. A horizontally polarized photon incident on PBS 220 continues in a straight line along optical path A1, while a vertically polarized photon is deflected to optical path A2. PBS 220 is oriented so that a photon PA in the polarization state $(|0\rangle+|1\rangle)/\sqrt{2}$ is transmitted (detected at DA1, probabilistically gives 0), while a photon in the state $(|0\rangle-|1\rangle)/\sqrt{2}$ is deflected (detected at DA2, probabilistically gives 1). In an example embodiment, this is accomplished via proper orientation of polarization rotating element 230. Depending on the polarization state of photon PA, either detector DA1 or DA2 clicks. This click is recorded in controller CA for a given photon emission event from light source 210.

Bob's measurement of the state of photon PB is more complicated and is based on loss induced generalized quantum measurement disclosed in the above-cited Huttner article. Photon PB, which is either in state $|\psi_0\rangle$ or state $|\psi_1\rangle$, is sent into the first polarization beam splitter 250. The vertically polarized part of the state is deflected to follow optical path A0 ("mode a") while the horizontally polarized part continues straight along optical path A3 (mode b). If the input state of the photon is given by $|\psi_{in}\rangle=\alpha|0\rangle_a+\beta|1\rangle_a$, where the subscripts on the states denote the mode, we have that just after PBS 250

$$|\psi_{in}\rangle=\alpha|0\rangle_a+\beta|1\rangle_b. \quad (33)$$

BS 256 has a transmissivity t and reflectivity r. This implies that after the photon passes through BS 256, the state $|0\rangle_a$ becomes $t|0\rangle_a+r|0\rangle_c$. Downstream of PBS 260, the output state of the photon $|\psi_{out}\rangle$ is $$|\psi_{out}\rangle=\alpha t|0\rangle_a+\beta|1\rangle_a+\alpha r|0\rangle_c. \quad (34)$$

Choosing $t=\tan\theta_0$, we have that if the input state is $|\psi_0\rangle$, then $$|\psi_{out}\rangle=\sin\theta_0(|0\rangle_a+|1\rangle_a)+\sqrt{\cos 2\theta_0}|0\rangle_c, \quad (35)$$

and if the input state is $|\psi_1\rangle$, then $$|\psi_{out}\rangle=\sin\theta_0(|0\rangle_a-|1\rangle_a)+\sqrt{\cos 2\theta_0}|0\rangle_c, \quad (36)$$

Note that the parts of the two output states in mode a have orthogonal polarizations at ±45 deg, and can be distinguished by orienting third PBS 280 such that the state $(|0\rangle_a+|1\rangle_a)/\sqrt{2}$ is transmitted (detected at DB1, gives 0) and the state $(|0\rangle_a-|1\rangle_a)/\sqrt{2}$ is deflected (detected at DB2, gives 1). This can be accomplished via polarization rotating element 270. If the photon is detected at SPD DB0 along optical paths A0 and A4 (i.e., in mode c) the procedure has failed. Note that both Alice's and Bob's measurements can be realized using simple linear optics. Elements 230 and 270 are half wave plates at 22.5°.

At Alice, two non-orthogonal states are detected, and at Bob corresponding two orthogonal states are detected. This is performed by the same set of elements 230, 220, DA1, DA2 and 270, 280, DB1, DB2.

Charlie keeps a record of all generated states sent to Alice and Bob by storing them in his controller CC. Charlie cannot know which of two possible states were sent to Alice or Bob, but Charlie knows what state was generated. Alice, via controller CA, informs Charlie and Bob (via controllers CC and CB) of all the transmission slots where no signal was obtained (i.e., neither SPDs DA1 nor DA2 clicked). These "no-signal" slots are discarded by all three parties. Also, the parties discard bits from slots for which there was either no click at all at Bob (neither of DB0, DB1 or DB2 clicked), or detector DB0 clicked. Also, both Alice and Bob report to Charlie and each other events of double clicks (occasions when DA1 and DA2 or DB1 and DB2 clicked), and these bits are also discarded.

After this culling process, the parties are left with a string of bits (slots) which correspond to states detected by Bob and by Alice. Bob has a string of states that he determined for sure, but can't say which parts of the original $|\Psi_0\rangle$ or $|\Psi_1\rangle$ states (generated by Charlie) they happen to be. By putting together corresponding bits, Bob and Alice can decide which states were originally generated by Charlie.

Quantum Secret Splitting for N Parties

An example embodiment of the method of the present invention includes the above-described quantum secret-splitting method generalized to the case where information about which of two states was sent is divided among any number of parties. We shall show how to do this for both qubits and for qutrits.

Let us start with two N-qubit states $$|\Psi_0\rangle = \cos\theta_0 |00\ldots 0\rangle + \sin\theta_0 |11\ldots 1\rangle,$$

$$|\Psi_1\rangle = \cos\theta_0 |00\ldots 0\rangle - \sin\theta_0 |11\ldots 1\rangle, \quad (37)$$

where $0 \leq \theta_0 \leq \pi/4$. Each of the qubits is sent to one of N parties, $A_1, \ldots, A_N$. Each of the parties, $A_1$ through $A_N$ measures their qubit in the $\{r_0, r_1\}$ basis (see Eq. (28) and $A_N$ performs the unambiguous-state discrimination procedure for the states $|\psi_0\rangle$ and $|\psi_1\rangle$ (see Eq. (32)). If parties $A_1$ through $A_{N-1}$ obtained $n_0$ results of $|r_0\rangle$ and $n_1$ results of $|r_1\rangle$, then the states that $A_N$ is distinguishing between are $$|\psi_{0N}\rangle = \cos\theta_0 |0\rangle + (-1)^{n_1}\sin\theta_0 |1\rangle,$$

$$|\psi_{1N}\rangle = \cos\theta_0 |0\rangle - (-1)^{n_1}\sin\theta_0 |1\rangle, \quad (38)$$

i.e. $A_N$'s qubit will be in the state $|\psi_{0N}\rangle$ if the state $|\Psi_0\rangle$ was sent and $|\psi_{1N}\rangle$ if the state $|\Psi_1\rangle$ was sent. In order to ascertain which of the two N-qubit states was sent, all of the parties will have to combine their information. If the measurement made by $A_N$ succeeds, then she will have obtained either $|\psi_0\rangle$ or $|\psi_1\rangle$, but she will not, without knowing the measurement results of all of the other parties, know which of these results corresponds to $|\Psi_0\rangle$ and which corresponds to $|\Psi_1\rangle$.

The procedure can be generalized to particles with more than two internal states, and to demonstrate this we shall consider the case of qutrits. Consider the three N-qutrit states $$|\Psi_0\rangle = c_0 |00\ldots 0\rangle + c_1 |11\ldots 1\rangle + c_2 |22\ldots 2\rangle,$$

$$|\Psi_1\rangle = c_0 |00\ldots 0\rangle + c_1 \omega |11\ldots 1\rangle + c_2 \omega^* |22\ldots 2\rangle,$$

$$|\Psi_2\rangle = c_0 |00\ldots 0\rangle + c_1 \omega^* |11\ldots 1\rangle + c_2 \omega |22\ldots 2\rangle, \quad (39)$$

where $\omega = e^{2i\pi/3}$. Define the single qutrit orthonormal basis $$|\eta_0\rangle = \frac{1}{\sqrt{3}}(|0\rangle + |1\rangle + |2\rangle), \quad (40)$$

$$|\eta_1\rangle = \frac{1}{\sqrt{3}}(|0\rangle + \omega|1\rangle + \omega^*|2\rangle),$$

$$|\eta_3\rangle = \frac{1}{\sqrt{3}}(|0\rangle + \omega^*|1\rangle + \omega|2\rangle).$$

Each of the N qutrits is sent to one of the parties $A_1, \ldots, A_N$. Now, parties $A_1$ through $A_{N-1}$ perform projective measurements in the basis $\{|\eta_0\rangle, |\eta_1\rangle, |\eta_2\rangle\}$, and suppose that $m_j$ of them find their qutrit in the state $|\eta_j\rangle$, j=0, 1, 2. The party $A_N$ performs the optimal POVM to unambiguously distinguish the states $$|\psi_0\rangle = c_0 |0\rangle + c_1 |1\rangle + c_2 |2\rangle,$$

$$|\psi_1\rangle = c_0 |0\rangle + c_1 \omega |1\rangle + c_2 \omega^* |2\rangle,$$

$$|\psi_2\rangle = c_0 |0\rangle + c_1 \omega^* |1\rangle + c_2 \omega |2\rangle. \quad (41)$$

After the parties $A_1$ through $A_{N-1}$ have performed their measurements, the qutrit belonging to $A_N$ is in one of the three states $$|\psi_{0N}\rangle = c_0 |0\rangle + c_1 \omega^{m_2-m_1} |1\rangle + c_2 \omega^{-m_2+m_1} |2\rangle,$$

$$|\psi_{1N}\rangle = c_0 |0\rangle + c_1 \omega^{m_2-m_1+1} |1\rangle + c_2 \omega^{-m_2+m_1-1} |2\rangle,$$

$$|\psi_{2N}\rangle = c_0 |0\rangle + c_1 \omega^{m_2-m_1-1} |1\rangle + c_2 \omega^{-m_2+m_1+1} |2\rangle. \quad (42)$$

The qutrit is in the state $|\Psi_{jN}\rangle$ if the original N-qutrit state was $|\Psi_j\rangle$, for j=0, 1, 2.

If the measurement made by $A_N$ succeeds, she will have found her qutrit in one of the states $|\psi_j\rangle$, j=0, 1, 2. She will not know to which of the original N-qutrit states it corresponds, however, without knowing the measurement results of all of the other parties. In particular, we have the correspondence $$\Psi_j \leftrightarrow \psi_{[j+m_2-m_1 \mod 3]}. \quad (43)$$

Therefore, all of the parties must combine their information in order to determine which of the three N-qutrit states was originally sent.

Note, that in both the case of N qubits and N qutrits, only one party will receive a failure signal if the measurement fails. In addition, the probability of failure is the best possible, i.e. it is the same as it would be if all of the qubits or qutrits were measured together. Consequently, we have not lost anything by measuring the particles separately.

CONCLUSION

The present invention includes a method of quantum secret splitting that distinguishes two non-orthogonal two-qubit states by local measurements and classical communication, making no errors, and with one of the parties receiving a failure signal if the procedure fails. Both of the parties make fixed measurements, and the measurement made by one party does not depend on the result obtained by the other. If the procedure succeeds, each party obtains either a 0 or a 1, and gains no information about the state from their individual results. However, on combining their results, the parties can identify the state and thus share information known only to the parties.

An eavesdropper, Eve, who intercepts one of the qubits prepared in the entangled state, cannot identify its state with certainty. The best she can do is to apply the two-state unambiguous state discrimination procedure, which will sometimes fail. When it does, she does not know which state to send on to Alice and Bob, and will, consequently, introduce errors, e.g. Alice and Bob will have detected $|\Psi_0\rangle$ when $|\Psi_1\rangle$ was sent. These errors can be detected if Alice and Bob publicly compare a subset of their measurements with information provided by the person who sent the states.

The method of the present invention provides protection against cheating. If Alice cheats by obtaining both qubits, then the best she can do is to apply two-state unambiguous state discrimination to them. Her measurement will sometimes fail, and then she has a problem. She must send a qubit to Bob, but there is no state for this qubit that will make Bob's measurement fail with certainty. That means that Bob will sometimes obtain incorrect results, i.e. when he and Alice combine their results, they will find that the state they detected was not the one that was sent. Therefore, cheating by Alice will introduce errors.

If Bob has obtained both particles, then he also can apply two-state unambiguous state discrimination to the two-qubit state. If his measurement succeeds, he can just send a qubit in the appropriate state to Alice, and if it fails, he can simply state that it failed. That means that cheating by Bob cannot be detected. However, a modification of the protocol solves this problem. When the two-qubit state is sent, the party sending the state can announce over a public channel which of the parties is to make the projective measurement and which is to make the three-outcome POVM. This means that part of the time, Bob will be assigned to make the projective measurement, and then his cheating will be detected. He can, however, not cheat if he is assigned to make the projective measurement, and in that case he will gain only partial information about the key and not be detected. In an example embodiment of the method, this problem is mitigated by combining several received bits into a block, the parity of which is a single key bit. In order for Bob to ascertain the key bit, he would have to know all of the received bits in the block, but the probability that he would is made very low by choosing a sufficiently large block size.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A quantum-based method of secret splitting, comprising:
preparing at a sender ("Charlie") two qubits each of which can be in one of two non-orthogonal states;
distributing the qubits to respective parties Alice and Bob;
at Alice, measuring the state of the qubit she receives by a projective measurement so that the measurement result is either 0 or 1;
at Bob, measuring the state of the qubit he receives such that the measurement result is either 0, 1 or f wherein f represents a failure by Bob to properly measure the qubit state; and
communicating between Alice, Bob and Charlie the outcome of their respective measurements so as to deduce the state of the qubits sent to Alice and Bob.

2. The method of claim 1, including discarding failed measurements by Bob.

3. The method of claim 2, including Alice and Bob forming a bit string based on the outcome of their respective measurements and the remaining qubit states after the failed measurements are discarded.

4. A quantum-based method of secret splitting between two parties, comprising:
preparing two qubits each having two possible states given by:

$|\Psi_0\rangle = \cos\theta_0|00\rangle + \sin\theta_0|11\rangle$, $|\Psi_1\rangle = \cos\theta_0|00\rangle - \sin\theta_0|11\rangle$, where $0 \leq \theta_0 \leq \pi/4$;
sending the qubits to respective receivers A and B;
at receiver A, performing a measurement of the qubit sent to receiver A using POVM elements $|r_j\rangle\langle r_j|$, for j=0, 1, with $|r_0\rangle = \frac{1}{\sqrt{2}}(|0\rangle + |1\rangle)$, $|r_1\rangle = \frac{1}{\sqrt{2}}(|0\rangle - |1\rangle)$.

so that receiver A obtains only the results 0 or 1 and never receives a failure result;
at receiver B, using POVM elements $\frac{1}{2}(1 + \tan^2\theta_0)|s_j\rangle\langle s_j|$, for $j = 0, 1$, with $|s_0\rangle = \frac{1}{\sqrt{2}}(\sin\theta_0|0\rangle - \cos\theta_0|1\rangle)$, $|s_1\rangle = \frac{1}{\sqrt{2}}(\sin\theta_0|0\rangle + \cos\theta_0|1\rangle)$, and $(1-\tan^2\theta_0)|0\rangle\langle 0|$, which respectively corresponding to measuring 0, 1 and a measurement failure; and
sharing between A and B the outcome of their respective measurements so as to form a common bit string.

5. A quantum-based method of secret splitting between more than two parties, comprising:
preparing two different quantum N-particle states of the form $|\Psi_0\rangle = \cos\theta_0|00\ldots0\rangle + \sin\theta_0|11\ldots1\rangle$, $|\Psi_1\rangle = \cos\theta_0|00\ldots0\rangle - \sin\theta_0|11\ldots1\rangle$, where $0 \leq \theta_0 \leq \pi/4$, one of the states represents the bit value 0 and the other represents the bit value 1;
sending a particle to each one of the receivers, say, $A_1, \ldots, A_N$;
performing at each receiver $A_1$ through $A_{N-1}$ a quantum measurement on the particle in the $\{r_0, r_1\}$ basis, where $|r_0\rangle = \frac{1}{\sqrt{2}}(|0\rangle + |1\rangle)$, and $|r_1\rangle = \frac{1}{\sqrt{2}}(|0\rangle - |1\rangle)$, wherein receiver $A_N$ performs the unambiguous-state discrimination procedure between states $|\psi_{0N}\rangle = \cos\theta_0|0\rangle + (-1)^{n_1}\sin\theta_0|1\rangle |\psi_{1N}\rangle = \cos\theta_0|0\rangle - (-1)^{n_1}\sin\theta_0|1\rangle$, where $n_1$ is the number of results of $|r_1\rangle$ obtained by receivers $A_1$ through $A_{N-1}$.

6. A quantum-based secret-splitting method, comprising:
generating at a sender a pair of entangled photons and providing the photons to two respective parties, Alice and Bob;
at Alice, measuring a state of the photon she receives as either a 0 or a 1;
at Bob, measuring a state of the photon he receives as either a 0, 1 or f, wherein f represents a failure to measure the proper photon state; and communicating between Alice, Bob and Charlie the outcome of their respective measurements so as to deduce the state of the qubits sent to Alice and Bob.

7. The method of claim 6, including discarding failed measurements by Bob.

8. The method of claim 7, including Alice and Bob forming a bit string based on the outcome of their respective measurements and the remaining qubit states after the failed measurements are discarded.

* * * * *